United States Patent [19]
Anderson

[11] Patent Number: 5,808,741
[45] Date of Patent: Sep. 15, 1998

[54] METHOD FOR REMOTELY DETERMINING SEA SURFACE ROUGHNESS AND WIND SPEED AT A WATER SURFACE

[75] Inventor: Kenneth D. Anderson, San Diego, Calif.

[73] Assignee: The United States of America as represented by the Secretary of the Navy, Washington, D.C.

[21] Appl. No.: 675,430

[22] Filed: Jun. 26, 1996

[51] Int. Cl.$^6$ .................................................. G01B 15/04
[52] U.S. Cl. ...................... 356/360; 356/359; 73/170.31
[58] Field of Search ............................... 73/105, 170.31; 356/3.12, 28.5, 356, 359, 360

[56] References Cited

U.S. PATENT DOCUMENTS

| | | | |
|---|---|---|---|
| 3,242,836 | 3/1966 | Bartsch . | |
| 3,533,697 | 10/1970 | Hughes . | |
| 4,210,399 | 7/1980 | Jain . | |
| 5,204,734 | 4/1993 | Cohen et al. | 356/359 |
| 5,268,742 | 12/1993 | Magner | 356/359 |
| 5,355,221 | 10/1994 | Cohen et al. | 356/359 |
| 5,381,222 | 1/1995 | Palmer . | |
| 5,438,334 | 8/1995 | Anderson . | |
| 5,469,259 | 11/1995 | Golby et al. | 356/359 |

FOREIGN PATENT DOCUMENTS

| | | | |
|---|---|---|---|
| 93/24805 | 9/1993 | WIPO | 356/359 |

*Primary Examiner*—Ronald L. Biegel
*Attorney, Agent, or Firm*—Harvey Fendelman; Michael A. Kagan; Peter A. Lipovsky

[57] ABSTRACT

Transmitted signals are used to remotely assess sea surface roughness and hence wind speed at a water surface. A signal is transmitted from a signal source as it moves either through air or space. A land- or sea-based antenna receives the signal directly from the signal source and indirectly from the signal source by way of reflection of the signal from the surface being examined. The sum of the directly and indirectly received signals form an interference pattern as the signal source is moved. The interference pattern has peak-to-null signal values that are characteristic of the surface conditions being analyzed. Reference interference patterns are then generated for known surface conditions, each of the reference patterns exhibiting "known" characteristic peak-to-null signal values. The peak-to-null signal values of the reference interference patterns are then compared to the peak-to-null signal values generated from the surface being examined. The reference interference pattern having known peak-to-null signal values most closely resembling the peak-to-null signal values generated from the surface being examined is determined. The known surface conditions of this reference interference pattern are then equated with the unknown surface conditions of the surface being examined. By using this technique one can determine the surface conditions of a sea surface as well as the wind speed present at such a surface.

23 Claims, 9 Drawing Sheets

METHOD FOR REMOTELY DETERMINING SEA SURFACE ROUGHNESS AND WIND SPEED AT A WATER SURFACE

BACKGROUND OF THE INVENTION

1. Field of the Invention

This invention pertains broadly to the field of communications. In greater particularity, the invention pertains to using a remotely transmitted signal to determine sea surface roughness and hence wind speed at a water surface.

2. Description of the Related Art

The surface roughness of a sea surface, which is related to wind speed immediately above the surface, is responsible for clutter observed on maritime radar systems. In addition, knowledge of the wind speed above the water surface is crucial to establish the vertical heat and momentum flux of the boundary layer adjacent to the surface, useful for a variety of purposes.

Surface roughness is normally determined by visual observation and estimation based on sea state. It may also be determined by measuring clutter with radio frequency or acoustic means.

The wind speed above a water surface is usually determined by an anemometer. Infrequently, visual observation of the sea state is used to estimate wind speed. Satellites, using sophisticated radar sensors, can provide wind speed estimates that are representative of large areas, typically swaths that are 20 kilometers wide or greater.

Because anemometers can be logistically difficult to utilize and because radio and acoustic radiating means can be intrusive, a need exists for a method of remotely sensing surface roughness and wind speed that is nonintrusive, easily used, and that lends itself to automation.

SUMMARY OF THE INVENTION

The invention uses signals transmitted from an airborne or spaceborne source to assess sea surface roughness and hence wind speed at a water surface. In the process of the invention, a signal is transmitted from a signal source as the source moves either through air or space. A land- or sea-based transducer receives the signal directly from the signal source and indirectly from the signal source by way of reflection of the signal from the surface being examined. The sum of the directly and indirectly received signals form an interference pattern as the signal source is moved. The interference pattern has peak-to-null signal values that are characteristic of the surface conditions being analyzed. Reference interference patterns are then generated for a plurality of known surface conditions, each of the reference patterns exhibiting "known" characteristic peak-to-null signal values. The peak-to-null signal values of the reference interference patterns are then compared to the peak-to-null signal values generated from the surface being examined. The reference interference pattern having known peak-to-null signal values most closely resembling the peak-to-null signal values generated from the surface being examined is determined. The known surface conditions of this reference interference pattern are then equated with the unknown surface conditions of the surface being examined. By using this technique one can determine the surface conditions of a sea surface as well as the wind speed present at such a surface.

OBJECTS OF THE INVENTION

It is an object of this invention to ascertain the character of a surface.

Another object of this invention is to determine the roughness of a surface.

A further object of this invention is to determine the roughness of a water surface.

A further object of this invention is to determine the roughness of a sea surface as well as the wind speed present at such a sea surface.

Other objects, advantages and new features of the invention will become apparent from the following detailed description of the invention when considered in conjunction with the accompanied drawings.

DESCRIPTION OF THE PREFERRED EMBODIMENT

Figure 1:
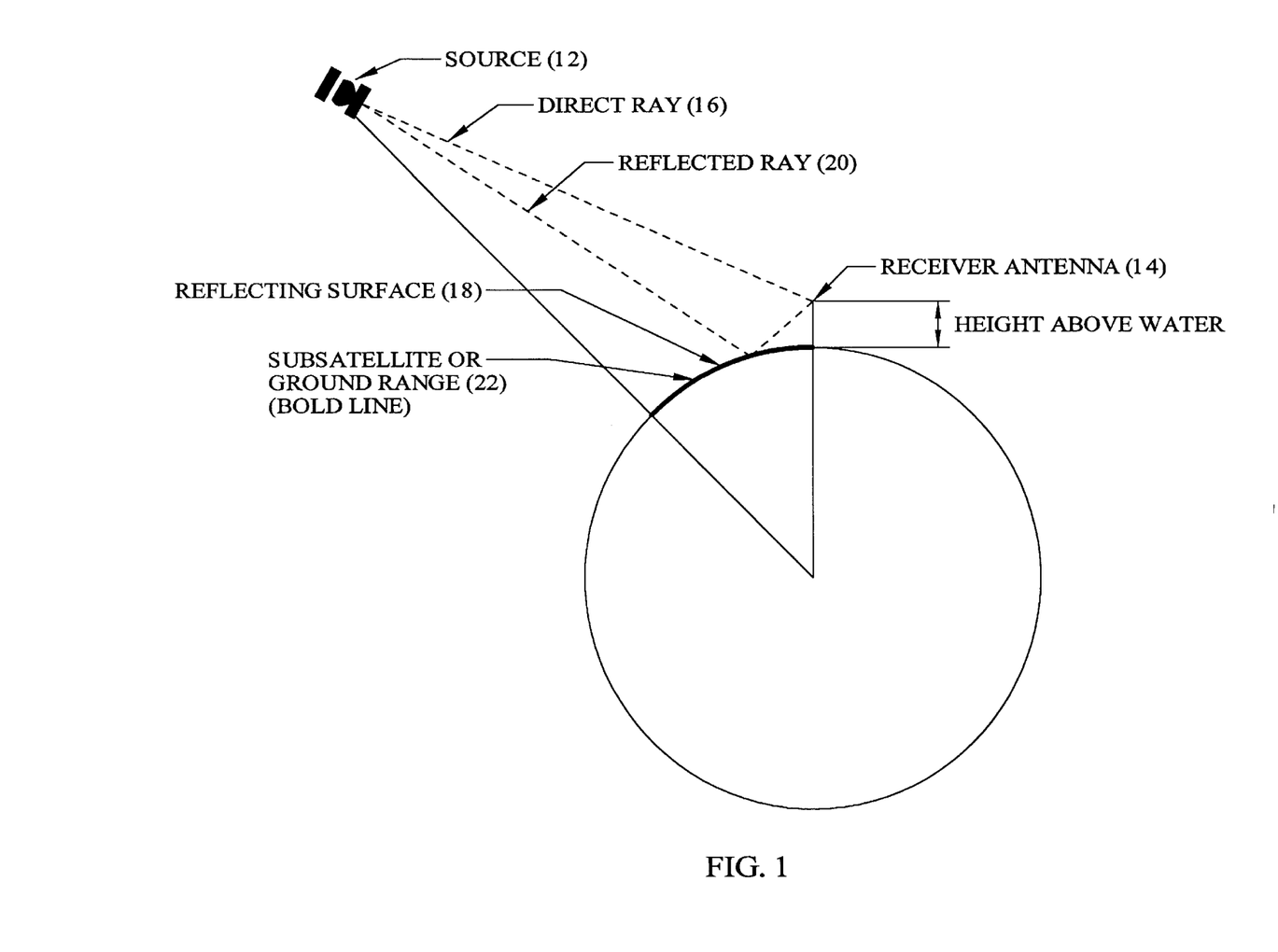
FIG. 1 is a diagrammatical illustration of a representative utilization of the invention.

Referring now to FIG. 1, a utilization of the invention is illustrated diagrammatically. In a preferred embodiment of the invention, radio frequency signals are transmitted from an airborne or spaceborne signal source 12 and are received by an earth-based antenna 14. Though radio frequency signals and an antenna are referred to here for example purposes, a wide variety of transmissions and receivers/transducers could be used, utilizing any acoustic or electromagnetic waveforms, including Continuous Wave, Pulse, Spread Spectrum, as well as light such as projected by lasers and the like.

Referring again to FIG. 1, source 12 is moving such that its geometry in relation to receiving antenna 14 is such that there are exactly two transmission paths or "ray paths" connecting it and the receiver. One ray path travels through the atmosphere directly between source 12 and receiver 14. This ray path is called the direct ray path, or simply a direct ray (16). The second ray travels a path from source 12 to reflecting surface 18 where it is reflected into receiving antenna 14. This ray path is called a reflective ray path, or simply a reflected ray (20).

A measure of the separation distance between source 12 and antenna receiver 14 is the ground range otherwise known as the subsatellite range 22 (shown in bold), defined as the range along the earth's surface from the base of the receiver to the nadir of the satellite. For purposes of this invention, this separation distance or measurement could be represented by a number of other forms such as elevation angle at the receiver, grazing angle, transmission slant range, etc.

As can be seen from FIG. 1, as source 12 moves in relation to receiver antenna 14, the path length difference between the direct and reflected rays will change, giving rise to an interference pattern present at the receiver.

For simplicity of description, the transmitted signal is assumed to be horizontally polarized Continuous Wave (CW). At some ground range, the difference between the distance traveled by the direct ray and the reflected ray, or path length difference, is an exact multiple of the transmitted signal's wavelength. At this range, assuming a perfectly smooth reflecting surface (which could only exist for zero wind speed), the receiver will measure nearly zero signal strength because the direct ray path signal is exactly out of phase with the reflected path signal and their sum, as measured at the receiver, is nearly zero (divergence effects slightly reduce the magnitude of the reflected ray component). At some other range closer or further away, the difference will be an odd multiple of half of the wavelength. At this range, the receiver antenna will measure nearly twice the magnitude of the individual signal. This is because the rays are exactly in-phase at the receiver antenna and their sum, as measured by the receiver, is nearly twice their individual value.

As signal source 12 moves through greater or lesser ranges, there may be many ranges where the received signals are in-phase, adding to a maximum signal received, and many ranges where the received signals are directly out-of-phase, adding to a minimum received signal. This is called an interference pattern and is also known as Lloyd's Mirror.

For signals transmitted at radio frequencies, the magnitude of the reflected ray is dependent on the surface conditions, or more specifically, the surface reflection coefficient that arises from the Kirchkoff-Huygens theory and that is expressed in terms of root mean square (rms) bump height $\sigma$, which is related to wind speed as $\sigma=0.0052u^2$, where u is wind speed in meters per second. The smooth surface Fresnel reflection coefficient, $R_o$, (which is dependent on the angle of incidence of the reflecting ray [grazing angle], polarization of the transmitted signal, and the refractive index of the transmission medium) is modified by a roughness factor that is dependent on the transmitted frequency and the bump height $\sigma$ (or wind speed). An expression for the rough surface reflection coefficient R is:

$$R=R_o \exp(-2k^2\sigma^2 \sin^2 \Psi), \qquad (Eq. 1)$$

where k is the wave number ($2\pi\lambda$) and $\Psi$ is the grazing angle.

Although this rough surface reflection coefficient R is for signals transmitted at radio frequencies, those skilled in the art will realize that similar procedures may be employed to determine R for acoustic and other electromagnetic transmissions including light.

Figure 2:
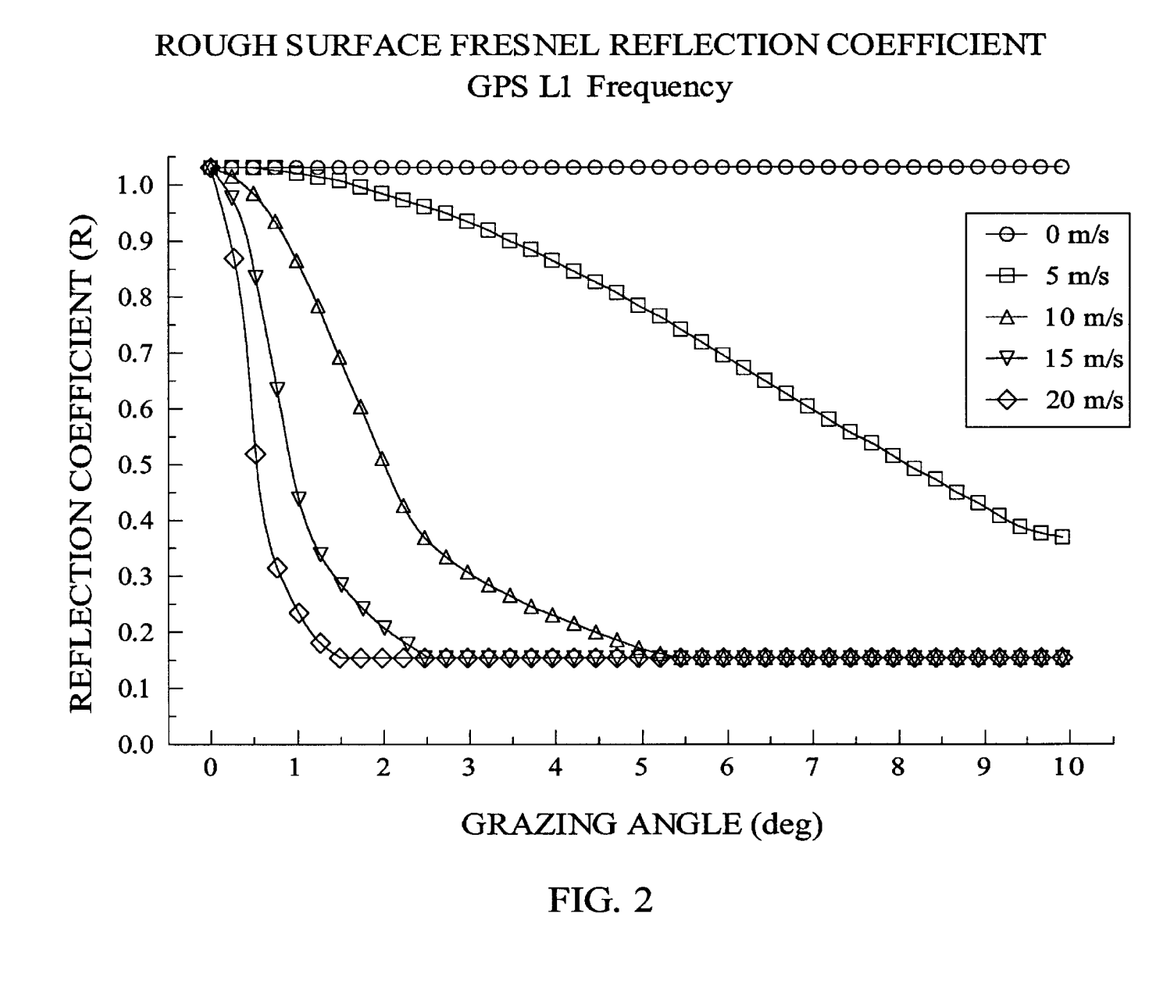
FIG. 2 illustrates a rough surface reflection coefficient in relation to signal grazing angle for a plurality of selected wind speeds.

FIG. 2 shows rough surface reflection coefficients (R) computed for a transmission frequency of 1,575.42 MHz, which is the L1 frequency for the Global Positioning System (GPS) satellites. R is shown for five selected wind speeds (0, 5, 10, 15, and 20 meters per second) in relation to grazing angle, $\Psi$, in degrees. The rough surface reflection coefficient is directly affected by wind speed.

Figure 3:
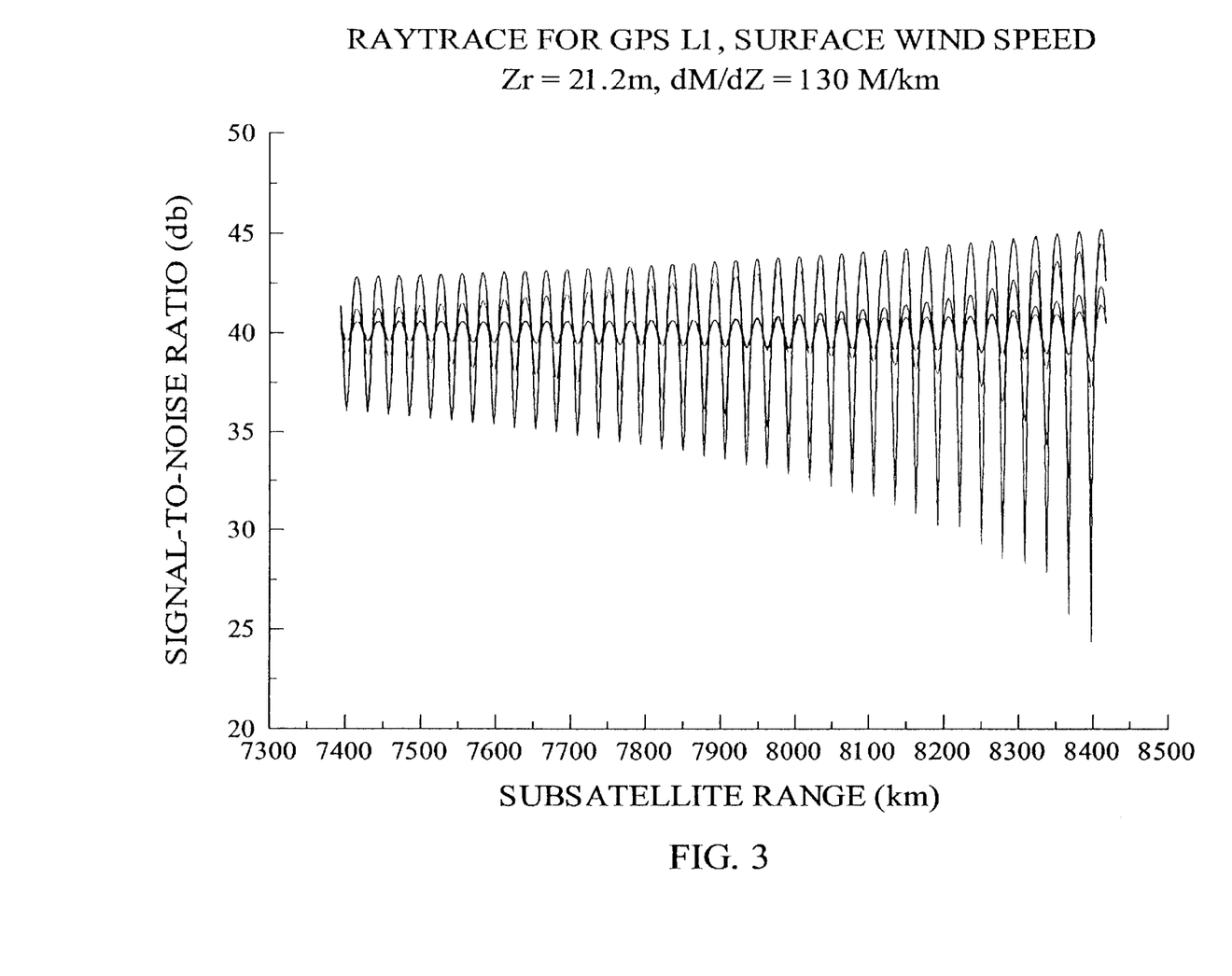
FIG. 3 shows generally the effect of wind speed on interference patterns generated according to the invention.

The effect of wind speed on an interference pattern generated according to the invention is shown in FIG. 3. In FIG. 3 it is assumed that an earth-based receiver 21.2 meters above a water surface is monitoring the circularly polarized L1 frequency transmitted by a GPS satellite. Instead of signal intensity, applicable to a CW signal, the received signals are plotted as signal-to-noise ratio (snr), which can be measured by any suitable GPS receiver. The abscissa is subsatellite range, which is defined as the range along the earth's surface from the receiver to the nadir of the satellite, and corresponds to geometric elevation angles from about 10 degrees at 7400 kilometers to about 1 degree at 8400 kilometers. Five interference patterns, one for each of five wind speeds, are shown superimposed. The interference pattern is created through ray optic techniques known to those skilled in the art such as those described in the 1980 edition of "Principles of Optics" by Max Born and Emile Wolf.

Figure 3A:
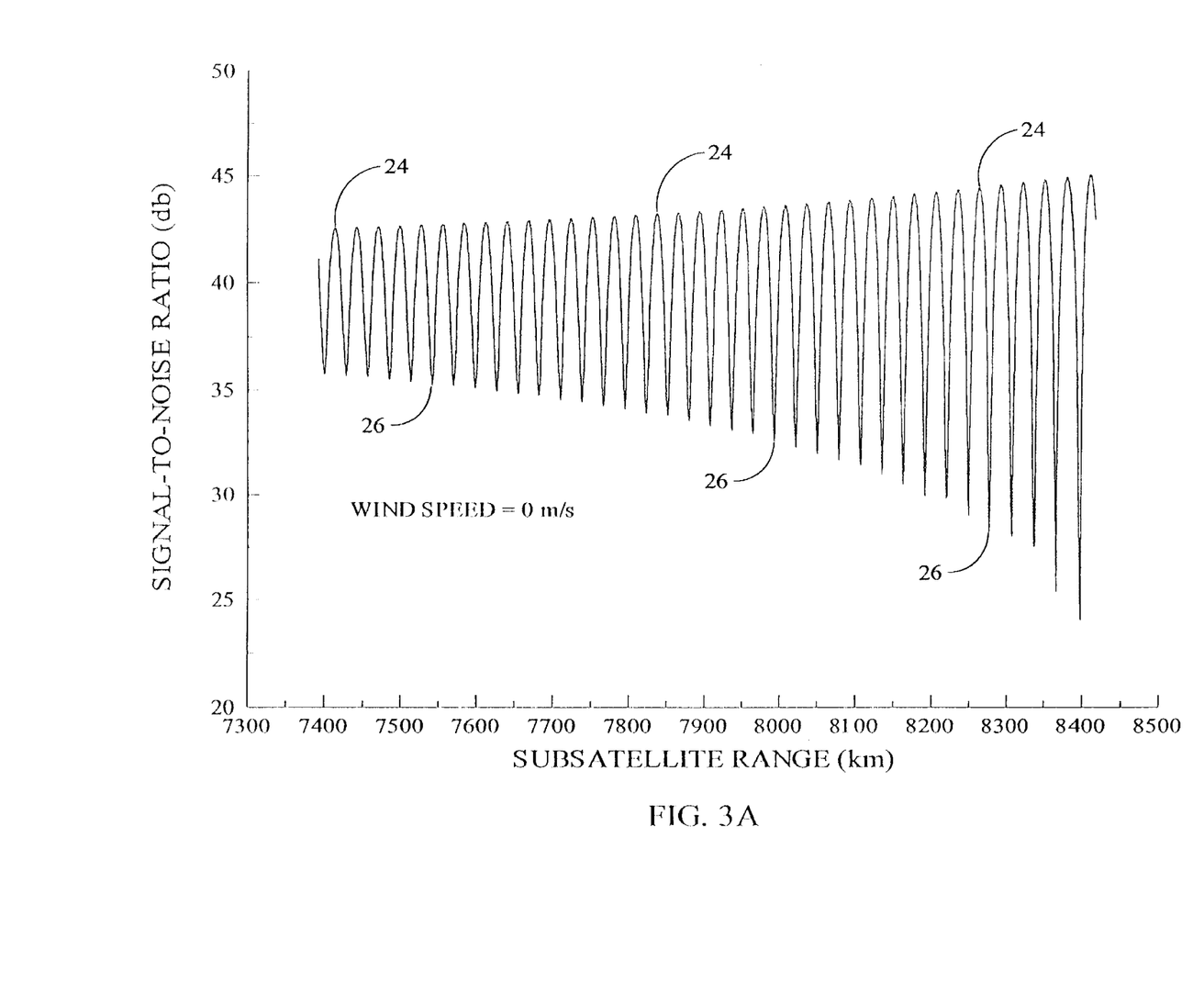
FIGS. 3A through 3E illustrate interference patterns for wind speeds of zero meters per second to twenty meters per second.
Figure 3B:
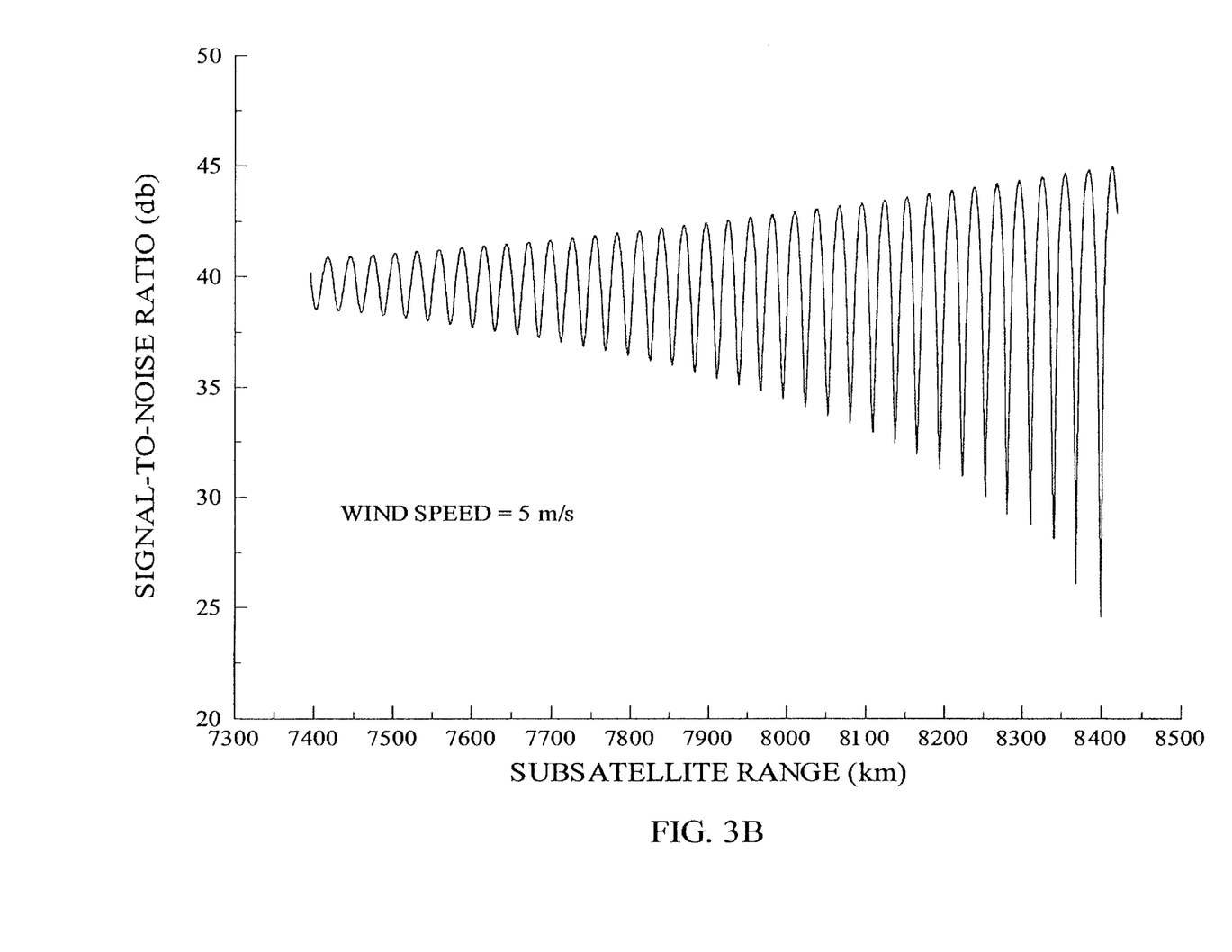
Figure 3C:
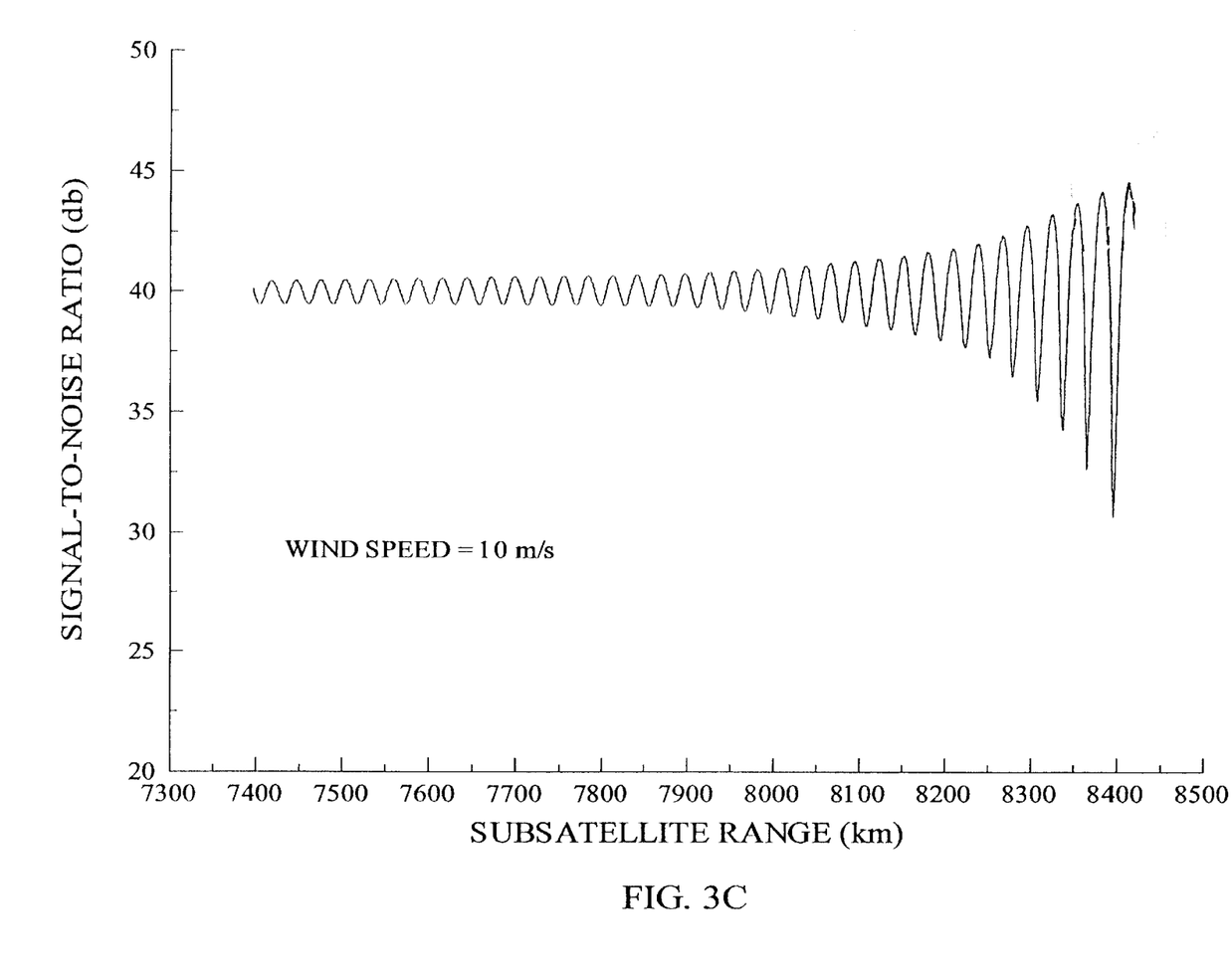
Figure 3D:
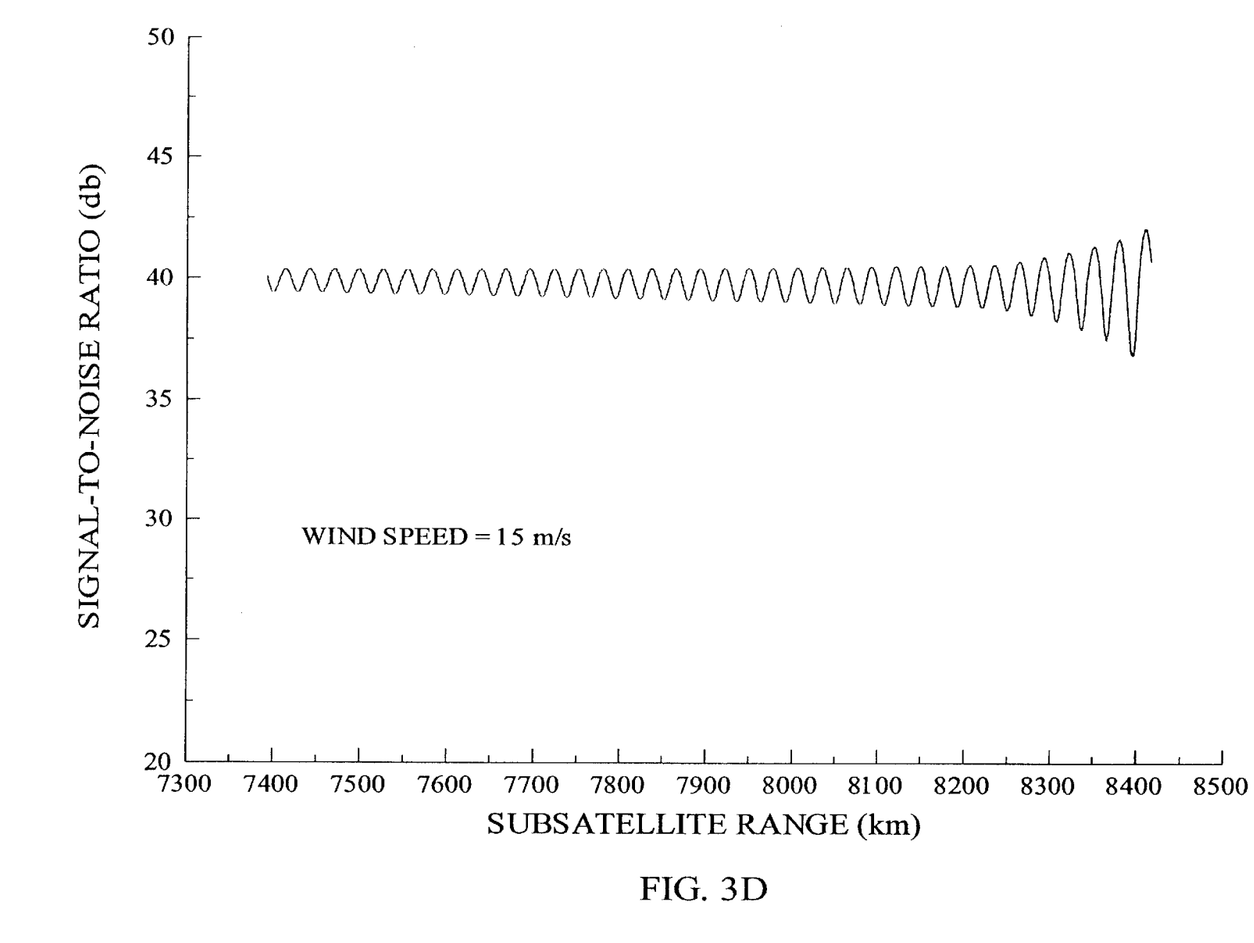
Figure 3E:
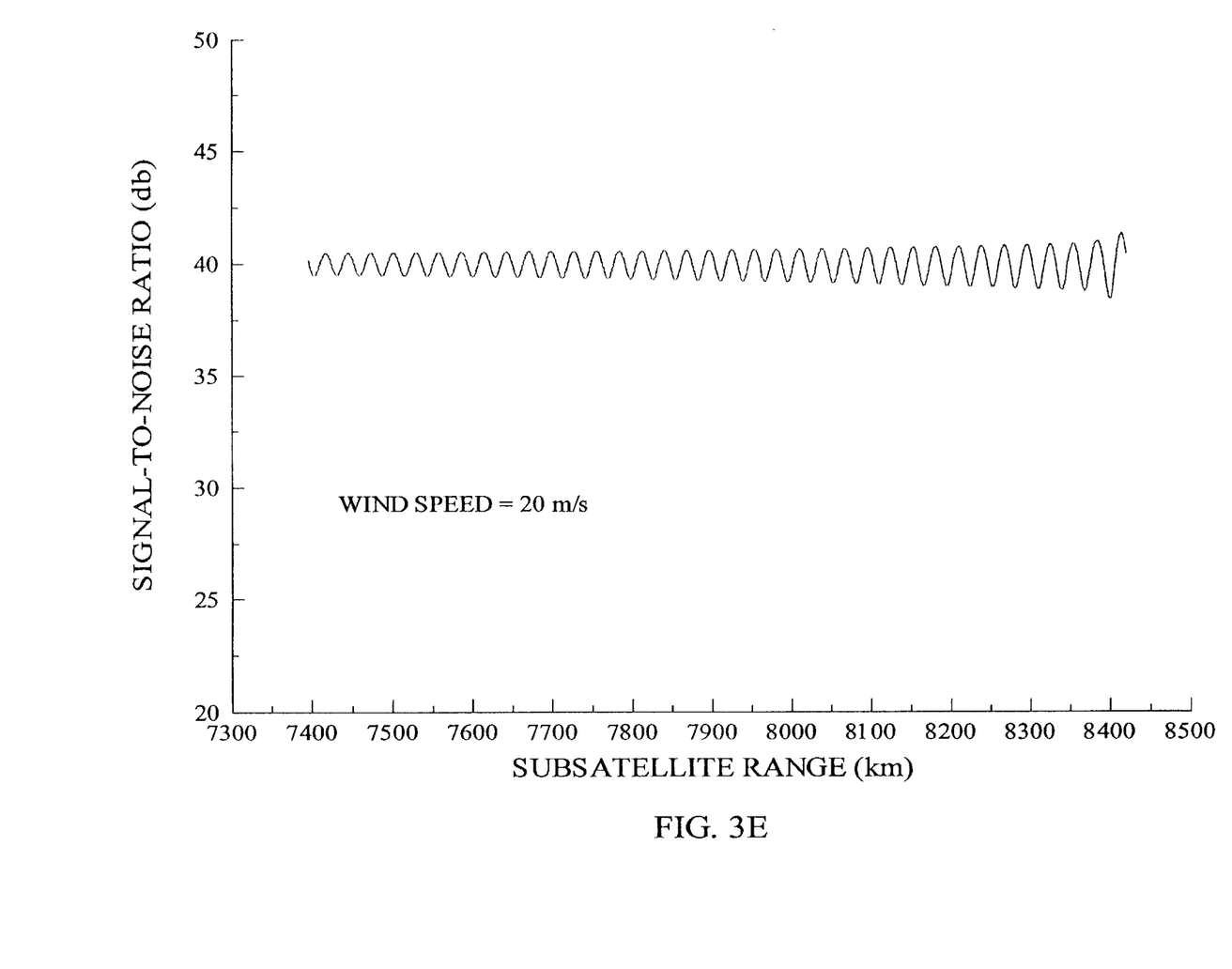

Referring to FIGS. 3A–3E as well as FIG. 3, the changes in peak-to-null differences are readily discernible for the various wind speeds shown. The "peak" in this instance is that portion of a cycle of an interference pattern that is of greatest signal-to-noise ratio versus a "null" signal value being that portion of a cycle of the interference pattern of least signal-to-noise ratio. In FIG. 3A exemplary peak 24 and null 26 values are referenced.

As can be seen most clearly in FIGS. 3A–3E, at low wind speeds and short subsatellite ranges, the peak-to-null snr difference is about three to six decibels (dB), whereas, at low wind speeds and longer subsatellite ranges, the peak-to-null difference is about 20 dB. At high wind speeds, the peak-to-null signal value difference changes only slightly with respect to range.

Figure 4:
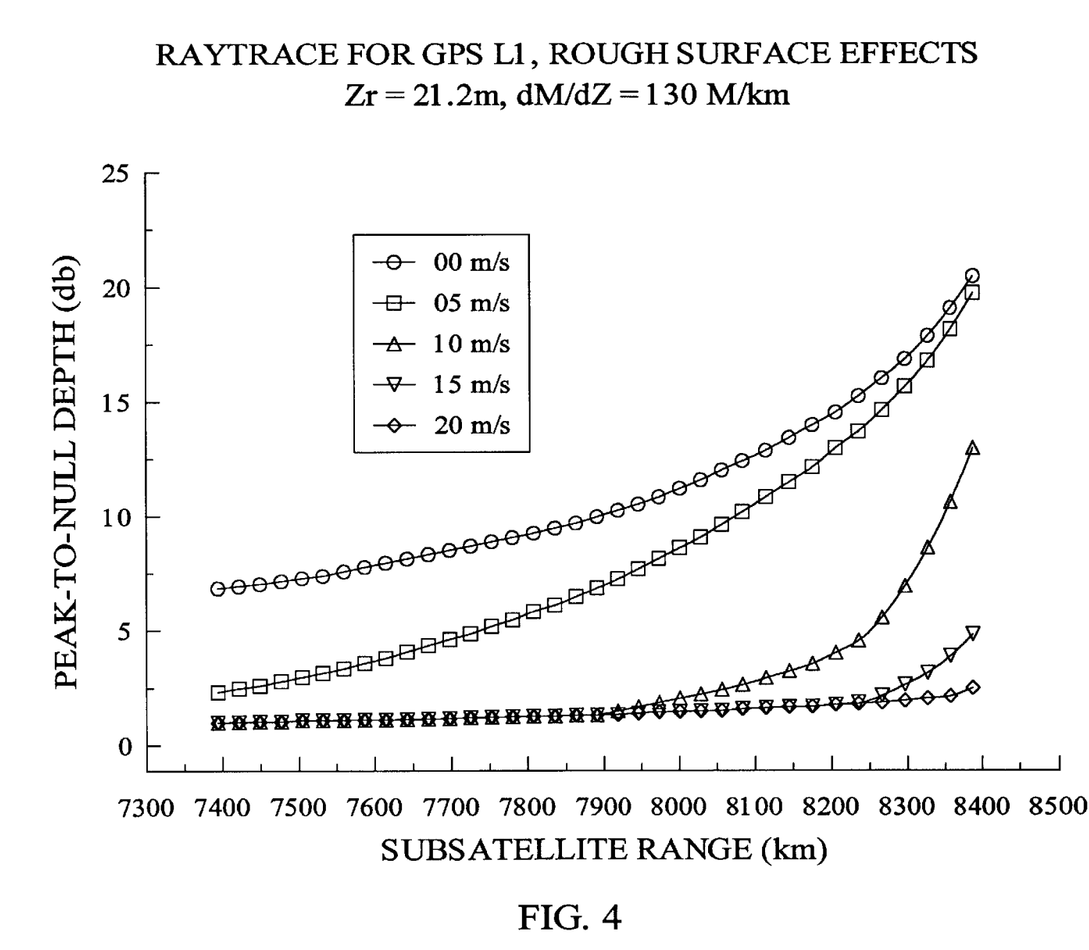
FIG. 4 shows generally the effect of wind speed on the difference or depth of peak-to-null values of interference patterns generated from a Global Positioning System (GPS) satellite transmission of the L1 frequency.

FIG. 4 summarizes the information of FIGS. 3A–3E by showing the peak-to-null signal value differences (peak-to-null depths) for the GPS satellite transmitting the L1 frequency to a receiver 21.2 meters above a water surface. In this figure, peak-to-null depth is shown calculated for five wind speeds and displayed in relation to subsatellite range. For wind speeds of about 5 meters per second or less, short range (high grazing angle) peak-to-null depths are a useful gauge of surface conditions. This is not true however for such wind speeds detected at longer ranges as it becomes difficult to discriminate between low wind speed peak-to-null values. For higher wind speeds, peak-to-null signal values can be a good identifier of such high wind speeds and corresponding surface conditions.

For a receiver monitoring a GPS L1 signal transmission, for example, measurements of peak-to-null signal depth versus range can be used to determine surface roughness and wind speed. To detect low wind speeds, examination of shorter range measurements is important, whereas, to detect higher wind speeds, examination of measurements at longer ranges is of greatest value. Once wind speed is determined, surface roughness could then be calculated by entering the determined wind speed in equation 1.

In carrying out the invention, the interference pattern generated by a reception of a signal reflected from a surface from unknown surface conditions as well as reception of this signal directly is compared to reference interference patterns generated for known surface conditions. These reference interference patterns can be generated by mathematical modeling and/or by direct physical measurement.

The reference interference patterns, or more specifically, the peak-to-null signal value characteristics of each of these patterns, are compared to the peak-to-null signal values of the interference pattern generated from the surface of unknown condition. The reference interference pattern having peak-to-null signal values most closely resembling those of the unknown surface condition interference pattern is determined and the unknown surface conditions are equated with the known surface conditions of the most closely resembling reference pattern. When reference interference patterns generated from known wind speed conditions are used, the wind speed found applicable to the surface under test can be used to directly compute surface roughness.

By utilizing the invention, sea surface roughness and wind speed at a sea surface can be determined by using remote sensing techniques that are nonintrusive, readily available, and amenable to automation. There is no requirement to install anemometers above a water surface nor is there a need to activate a radar to measure sea clutter.

obviously, many modifications and variations of the invention are possible in light of the above teachings. It is therefore to be understood that within the scope of the appended claims the invention may be practiced otherwise than as has been specifically described.

What is claimed is:

1. A method for gauging roughness of a surface comprising the steps of:

transmitting a signal from that is moving with respect to a transducer;

receiving on said transsducer said signal directly from said source;

receiving on said transducer said signal indirectly from said source by way of a reflection of said signal from said surface;

summing said directly and indirectly received signals to form a summed signal; and using said summed signal as an indicator of surface roughness.

2. A method according to claim 1 in which said source is airborne.

3. A method according to claim 1 in which said source is spaceborne.

4. A method according to claim 1 in which said transducer is an antenna.

5. A method according to claim 4 in which said source is airborne.

6. A method according to claim 4 in which said source is spaceborne.

7. A method according to claim 1 in which said summed signal is an interference pattern having peak and null values.

8. A method according to claim 7 in which the difference in said peak and null values corresponds to the degree of surface roughness.

9. A method for gauging the roughness of a water surface comprising the steps of:

transmitting a signal from a signal source that is moving with respect to a transducer;

receiving on said transducer said signal directly from said signal source;

receiving on said transducer said signal indirectly from said signal source by way of a reflection of said signal from said water surface;

summing said directly and indirectly received signals to form a summed signal; and using said summed signal as an indicator of surface roughness of said water surface.

10. A method according to claim 9 in which said transducer is an antenna.

11. A method according to claim 10 in which said source is airborne.

12. A method according to claim 10 in which said source is spaceborne.

13. A method according to claim 9 in which said transducer is an optical receptor.

14. A method according to claim 9 in which said transducer is an acoustic receptor.

15. A method according to claim 9 in which said summed signal is an interference pattern having peak and null values.

16. A method according to claim 9 in which the difference in said peak and null values corresponds to the degree of surface roughness.

17. A method for gaging surface conditions comprising the steps of:

(a) transmitting a signal from a source;

(b) receiving on a transducer said signal directly from said signal source;

(c) receiving on said transducer said signal indirectly from said source by way of a reflection of said signal from a surface of unknown surface conditions;

(d) moving said source with respect to said transducer;

(e) repeating steps a, b and c as said source moves;

(f) generating an interference pattern from said directly and indirectly received signals, said interference pattern depicting a signal characteristic with respect to a measurement indicative of distance between said source and said transducer, said interference pattern exhibiting characteristic peak-to-null signal values;

(g) generating reference interference patterns for a plurality of known surface conditions, each of said reference interference patterns exhibiting known characteristic peak-to-null signal values;

(h) comparing said known characteristic peak-to-null signal values with the characteristic peak-to-null signal values from step f;

(i) finding the reference interference pattern having known characteristic peak-to-null signal values most closely resembling those determined in step f; and (j) equating said unknown surface conditions with the known surface conditions of the reference interference pattern found in step i.

18. The method of claim 17 in which at least some of the reference interference patterns generated in said step g are generated by mathematical modelling.

19. The method of claim 17 in which at least some of the reference interference patterns generated in said step g are generated by physical measurement.

20. The method of claim 17 in which said reference interference pattern generated in said step g is determined through ray-optics.

21. A method according to claim 17 in which said surface is water.

22. A method according to claim 21 in which said step of moving said source includes moving said source through the air.

23. A method according to claim 21 in which said step of moving said source includes moving said source through the space.

* * * * *